Nov. 7, 1961 G. G. F. SMEETS 3,007,253
CALIBRATED POSITIONING DEVICE
Filed March 25, 1957 2 Sheets-Sheet 1

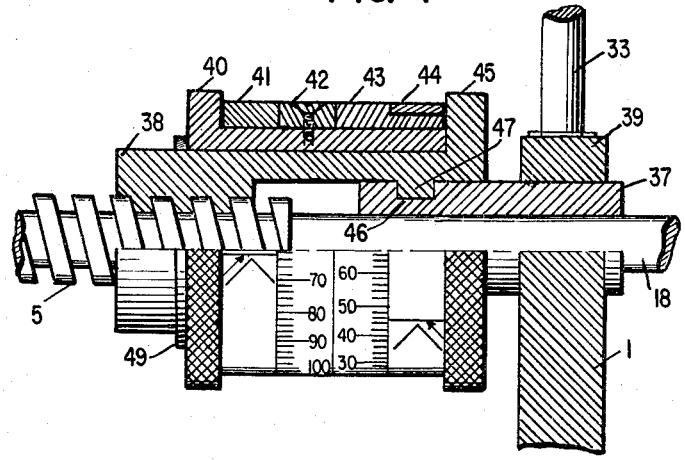
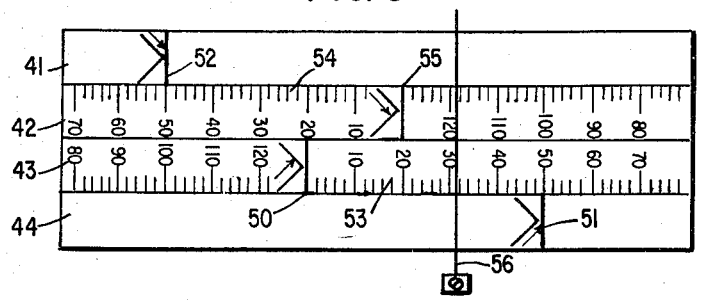
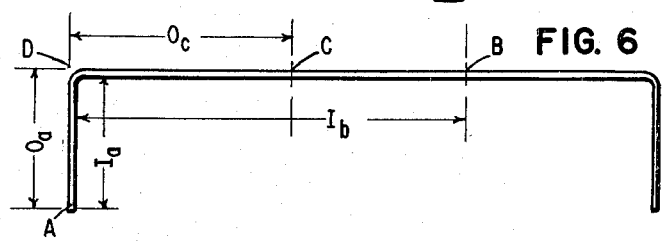
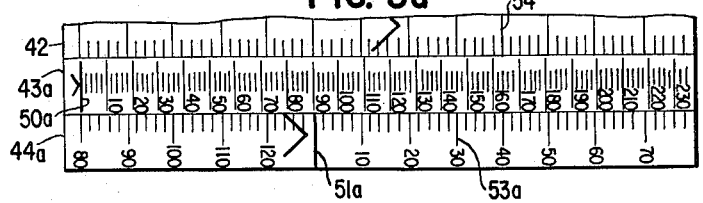

United States Patent Office 3,007,253
Patented Nov. 7, 1961

3,007,253
CALIBRATED POSITIONING DEVICE
Gerard G. F. Smeets, Downsview, Ontario, Canada, assignor to Strippit Tool & Machine Limited, Brampton, Ontario, Canada, a corporation of Canada
Filed Mar. 25, 1957, Ser. No. 648,017
18 Claims. (Cl. 33—189)

My invention relates to calibrated positioning devices and relates primarily to an improved manner of showing the extent of adjustment of a machine tool with respect to a reference point. My invention further provides means for adjusting for tolerances or other minor adjustments without requiring a change in the indication showing the extent of the major adjustment of the machine tool.

My invention finds particular application in a layout marking or drilling machine wherein such marking or drilling must be made in accordance with the measurements given on a drawing wherein the main measurements are normally in fractions and the tolerances in decimals of units.

With the apparatus available at present it is necessary for an operator to add and subtract fractions and decimals wherein the fraction is converted to its decimal equivalent to facilitate this end. This is a time consuming practice and is a source of errors and rejects in the final product. This is particularly true in the case of chassis layout for electronic apparatus. The drawing for such a layout gives dimensions from the edge of the chassis to centers of holes or other points. The chassis is normally box-shaped and it is very desirable that holes be marked and drilled on a flat piece of material prior to the bending down of the sides as this lends greatly to the ease of the operation. In order to effect the work in this manner, an allowance in dimensions must be made for the depth of the edges as well as the bend allowance of the subsequent bend. This increases the complexity of the measurement calculation giving rise to possible further error. More time can be spent calculating the necessary dimensions than is required for the actual marking of the workpiece and this gives rise to an undue increase in cost of production.

It is, therefore, an object of my invention to provide a machine tool adjusting and indicating device which allows minor adjustments to be made without any change being shown on a main indicator.

It is a further object of my invention to provide a displacement indicating device which is unambiguous in its indication and easily read.

It is a still further object of my invention to provide a tool adjustment indicator zeroing means so that any desired reference point may be arbitrarily selected and further adjustments will be shown with respect to the selected reference point.

It is a still further object of my invention to provide an adjusting and indicating device which is simple in construction and economical to manufacture.

It is also an object of my invention to provide for rapid traverse of the adjustable device and at the same time allow for accurate and final adjustment.

A further object of my invention is to provide an indicating device which will provide direct readings as to the displacement of a member in either direction from a selected zero reference point.

In accordance with one embodiment of my invention, an adjustable positioning device is comprised by a movable element detachably coupled to the threads of a lead screw. A drum having a helical calibrated scale thereon is coupled to the lead screw in such a manner as to be rotated thereby and displaced axially therealong in co-relation to the movable element. A calibrated scale having a series of equally spaced openings or windows therealong indicates the adjustment of the movable element by means of an index point moving in unison with the movable element while at the same time the calibrated drum, in cooperation with the said windows, indicates accurately the fine degree of adjustment with respect to a selected window.

Separate adjustment of the calibrated scale parallel to the axis of the lead screw is provided for so that any arbitrary reference point may be selected and the scale adjusted so that the index point may indicate any desired unit on the calibrated scale. Separate adjustment of the calibrated drum is provided for so that the indication in the appropriate scale window may be as desired. In addition, calibrated means is supplied for the accurate axial adjustment of the lead screw with respect to the supporting frame of the positioning device.

My invention is applicable for use in such devices as micrometers, machine tool positioning and other analogous uses.

My invention will now be described with reference to the figures of the drawings in which:

FIG. 4 is a partial cutaway view of a calibrated vernier device which is adapted to adjust the axial displacement of the lead screw with respect to the main body of the machine shown in FIG. 1;

FIG. 5 is a linear schematic representation of the scale arrangement of the device of FIG. 3;

FIG. 5a is a schematic representation of a modification of FIG. 5; and

FIG. 6 illustrates a layout problem pertaining to the application of the invention.

Figure 1:
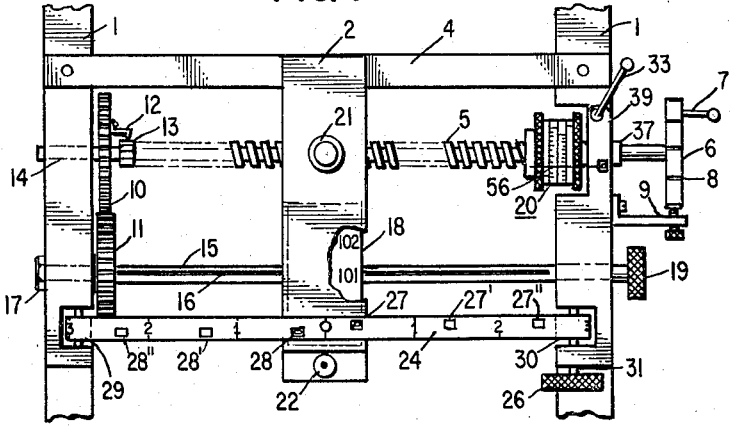
FIG. 1 shows a plan view of a machine tool positioning device to which my invention has been applied.
Figure 2:
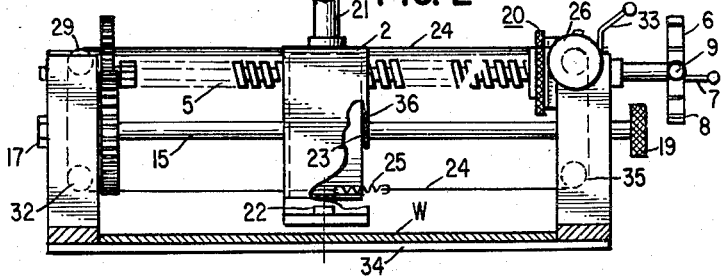
FIG. 2 shows a vertical view of the device as shown in FIG. 1.

Referring to FIGS. 1 and 2, the machine tool positioning device is shown as comprising two main frame or supporting members 1. A cross-member 4 is secured at either end to frame members 1 as by bolts or welding. A tool carrier member 2 is slidably supported by cross-member 4 and a lead screw 5 which is threaded for the major part thereof as shown. Carrier member 2 has screw threads which cooperate with those of lead screw 5 to cause axial displacement of carrier 2 parallel to lead screw 5 when it is rotated by crank wheel 6 which is provided for that purpose. Provision is also made to allow for the decoupling of carrier 2 from the threads of lead screw 5 to provide for rapid traverse. This decoupling may take any of the well known forms.

Carrier member 2 is provided with a tool supporting member 21 which may take the form of a cylindrical post secured at its base to carrier 2. At the end of carrier member 2 remote from cross-member 4 there is provided a tool aligning bearing 22 through which a drill bit or marker may extend below to contact a workpiece W supported on a table 34 (FIG. 2) to which also is secured frame members 1 of the machine tool positioning device.

Lead screw 5 is journalled at either end in frame members 1. At the left hand side of FIG. 1, a bearing member 14 supports lead screw 5 and allows for axial as well as rotational displacement. The right hand end of lead screw 5 is supported in a bearing 37 which is secured to frame member 1 by clamping means incorporating a clamping screw 33. Limited adjustment of bearing 37 in a direction axially of lead screw 5 is thus provided for the purpose of which will become apparent as this description proceeds. Secured to the right hand end of lead screw 5 is a crank wheel 6 having a crank handle 7. Wheel 6 is indented at points 8 equally displaced about the circumference thereof. A detent member 9, secured to the right hand frame member 1, cooperates with indentations 8 to provide rotational locking positions for lead screw 5. Device 9 may comprise a main support member secured to frame member 1 and a pointed thumb screw which may be advanced to coact with one of the indentations 8 to prevent further rotation of wheel 6. A vernier adjustment mechanism 20 cooperates with right hand frame member 1 to provide for small accurate axial adjustments of lead screw 5, the purpose and operation of which will be described with reference to FIG. 4.

A gear wheel 10 is journalled on the left hand end of lead screw 5 in such a manner as to provide for free relative rotation with respect thereto. A detent member 12 secured to gear 10 cooperates with indentations 13 on lead screw 5 to normally provide for synchronous rotation of lead screw 5 and gear 10. Indentations 13 are preferably, but not necessarily, spaced corresponding to indentations 8 on crank wheel 6.

Gear wheel 10 meshes with a second gear wheel 11 secured to a shaft 15 which is journalled in frame members 1. Shaft 15 is secured against axial movement by means of gear wheel 11 and a nut 17 which are on either side of left hand frame member 1. Shaft 15 is splined by means of a groove 16 which extends between frame members 1. A drum 18 is secured by a key member, not shown, to shaft 15 to be rotational therewith but free to move axially with respect thereto. Drum 18 is moved axially of shaft 15 by carrier member 2 whose vertical sides (FIG. 2) extend downward on either side thereof as shown at 36. In order that there be substantially no free movement of drum 18 with respect to carrier 2 a spring washer 23 is provided therebetween.

A knurled knob 19 is affixed to the right hand end of splined shaft 15 for the purpose of rotating drum 18 relative to lead screw 5. To effect this, lead screw 5 is locked against rotation by the action of stop 9 on wheel 6 and the coupling of gear 10 to lead screw 5 by indentations 13 and detent 12 is overcome by applying turning force to knob 19 to rotate drum 18 to the desired position.

A calibrated scale or tape device 24 extends across between the upper sides of frame members 1 and over rollers 29, 30, 35, and 32 and the free ends are tied together by means of a spring 25 as shown in FIG. 2. A knurled wheel or knob 26 is corotatably connected to the roller 30 by a shaft 31 and is provided to allow for adjustment of the tape over the rollers, the purpose of which will be described subsequently.

Figure 3:
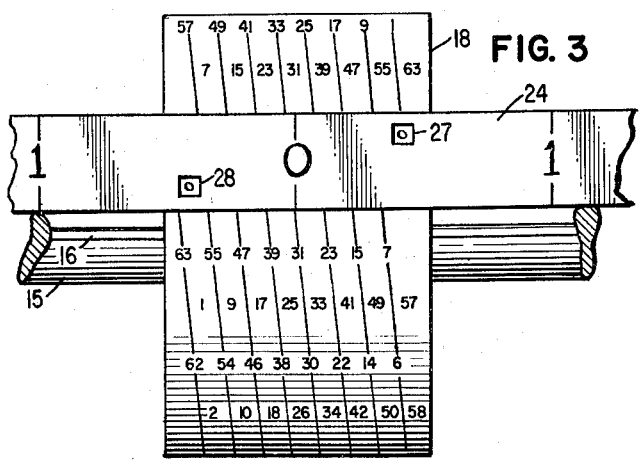
FIG. 3 shows an enlarged view of the main adjustment indicator of the device of FIG. 1.

Scale device 24 is provided with reference means which includes calibration indices and also includes two series of windows 27, 27' etc. and 28, 28' etc. which appear on opposite edges of the scale on opposite sides of the zero point thereof as best shown in FIG. 3.

Referring now to FIG. 3 the drum 18 and scale 24 are shown in greater detail. Drum 18 is calibrated so as to show eighths of a revolution on a helical scale up to a maximum of eight complete revolutions. A calibration from 1 to 64 in anti-clockwise rotation, looking at the left hand end of drum 18, will appear in window 27 as the drum is rotated with shaft 15 and displaced axially to the right from zero by carrier 2 in cooperation with lead screw 5. The screw thread of lead screw 5 may have a pitch of one-eighth inch and thus if gear wheels 10 and 11 are of the same outside diameter each complete turn of lead screw 5 will displace carrier 2 one-eighth inch and will be indicated in window 27 of tape 24 as eight sixty-fourths of an inch. Similarly, if lead screw 5 is rotated in such a manner as to cause carrier 2 to move to the left, drum 18 will rotate in this case in a clockwise direction and indicate on a second helical scale provided for that purpose by means of window 28 the number of sixty-fourths of an inch displacement axially left of carrier 2. When carrier 2 has been displaced exactly one inch, for instance, to the right, the calibration on drum 18 will appear and indicate zero in window 27'. Any subsequent movement to the right greater than one inch will be shown in window 27' up to the point whereat two inches is equalled or exceeded at which time the next window 27" will come into play and so on. Similarly, movements to the left of carrier 2 effected by lead screw 5 will be indicated in windows 28 up to one inch, 28' up to two inches and so on.

The two helical scales on drum 18 are interlaced and the windows 27 and 28 are placed so that only the scale pertinent to the direction of travel appears in the appropriate window. There is an exception to this whereat when the index marker on carrier 2 coincides with the zero point on scale 24 and the drum is set to indicate zero in window 27, the zero point for the calibration for the other direction of travel will simultaneously appear in window 28.

Windows 27 and 28 should only be of such a size as to show the calibration related to the displacement from zero of carrier 2 clearly without showing the calibration pertinent to the opposite displacement.

In the embodiment described the helical scales of drum 18 will each comprise eight convolutions at a pitch of one-eighth inch.

It should be noted that carrier 2, when decoupled from lead screw 5, may be freely moved to the left or right and may be allowed to re-engage lead screw 5 and if precautions are taken to maintain the same window reading before and after the movement, a predetermined number of equal units of displacement can be rapidly and accurately attained. Allowance, of course, has to be made for the change of readings if the carrier is displaced in either direction past the zero point of scale 24 since window readings must then be converted to take account of the change from window series 27, 27' etc. to 28, 28' etc. or vice versa since the helical scales are calibrated in opposite directions. Thus the reading in a window of the 27 series window must be subtracted from 64 to get the correct reading for the 28 series windows if carrier 2 is moved to the left past the zero point of scale 24. The converse is also true.

The vernier device 20 which is provided for accurate axial adjustment of lead screw 5 will now be described with reference to FIG. 4 of the drawings. FIG. 4 shows a partial cutaway view which shows the internal structure of device 20.

Device 20 comprises a knob which includes a main threaded nut member 38, which is threaded onto lead screw 5 as shown, and having an integral knurled ring 45. Lead screw 5 is shown as having a reduced end portion 48 which is journalled in the bearing 37 movably secured to frame member 1. Bearing 37 may be moved laterally to the right or left of frame member 1 after first loosening clamping screw 33 provided for that purpose.

Bearing 37 has a key slot 46 provided therein which cooperates with a key 47 internal of nut 38 in an enlarged end portion thereof. By this means nut member 38 is secured against axial displacement from bearing 37 while still being free to rotate. The fit between the threads of nut 38 and lead screw 5 is tight so that normally the two rotatae as a unit. By holding lead screw 5 stationary and rotating nut 38 by means of integral knurled ring 45 axial displacement of lead screw 5 with respect to bearing 37 and frame member 1 is effected. One complete rotation of nut 38 relative to lead screw 5 will axially displace the lead screw by one-eighth inch.

A main collar member 40 is fitted over nut 38 and is held in place by a clamping ring 49. Collar 40 is free to rotate about nut 38 and is provided with a knurled ring portion to facilitate such rotation. Collar 40 is further provided with a collar member 42 which is secured thereto by screw means as shown in FIG. 4. A further collar or ring member 41 is held for rotation between collar 42 and the knurled ring portion of collar 40. An additional collar 43 of cross-section as shown in FIG. 4 is provided between collar 42 and knurled ring 45. On the reduced end portion of collar 43 is rotatably fitted a further collar 44. It should be noted that rotation of collar 40 is effective to rotate collars 41 to 44 inclusive. Rotation of collar 43 is normally effective also to cause rotation of collar 44. In addition, it should be noted that rotation of one of the collars 41 to 44 inclusive can be made relative to any one or all of the remaining collars.

Referring now in particular to FIG. 5, collar member 41 is provided with an index marker 52 as shown. Collar member 42 is provided with angularly spaced indicia which define a ring scale 54 which is calibrated for instance to show one one-thousandth of an inch axial displacement of lead screw 5 for each scale unit of rotation of nut 38 with respect to lead screw 5. An index finger 56, which is secured to frame member 1 in a suitable manner to override collar members 41 to 44 inclusive, is provided as a reference means to faciliate accurate displacement of lead screw 5. Collar member 43 is provided with angularly spaced indicia which define a ring scale 53, having calibration units similar to that of scale 54 but having an opposite direction of rotation. Collar member 44 has an index marker 51.

The scale set-up as shown in FIG. 5 has been especially adapted for application to chassis layout work wherein the bend allowance of metals must be taken into account.

Index marker 52 of collar member 41 is designated as being related to an outside dimension such as $O_a$ of FIG. 6. Index marker 55 of collar 42 is located at the zero point of calibrated scale 54 and is indicated as being related to an inside dimension such as $I_a$ of FIG. 6. Index marker 50 is located at the zero point of scale 53 of collar 43 and is indicated as relating to an inside dimension such as $I_b$. Index marker 51 of collar 44 relates to an outside dimension such as $O_c$ of FIG. 6.

As described, index markers 55, 52 and 50, 51 relate to inside and outside dimensions to the left and the right respectively of a right angle bend.

The use of the scale in conjunction with chassis layout can best be explained with reference to FIG. 6 wherein it is desired to drill holes at points B and C in a metal chassis having a depth of sides $I_a$ inches. Point B is located $I_b$ inches from the left hand edge of the chassis and point C is located $O_c$ inches from the same side. $I_a$ and $I_b$ are inside dimensions and $O_c$ is an outside dimension. It is desired to drill holes B and C before the chassis is formed, that is before the sides are bent down.

Referring to FIG. 6 it is known that the distance from A to B on the unformed sheet is (1) $\quad A \rightarrow B = I_a + I_b - 0.43R + BA$ wherein R is the radius of the bend and BA is the bend allowance for the type of metal used in the chassis having a thickness T. In this instance we shall consider BA to be $^{20}/_{1000}$ inch and T $^{50}/_{1000}$ inch and the radius of the bend to be zero.

The collars 41 to 44 inclusive are now set up in the following manner. The index marker 52 on collar 41 is rotated to the left (FIG. 5) until the distance from the zero index marker 55 is indicated as $^{50}/_{1000}$ inch. Collar 44 is now rotated relative to collar 43 to indicate a displacement of $^{50}/_{1000}$ inch between index marker 50 which is located at zero of scale 53 and index marker 51. Finally collars 43 and 44 are rotated as a unit with respect to collar 42 until index markers 55 and 50 are displaced by a reading of $^{20}/_{1000}$ inch—the bend allowance.

Now, in order to drill hole B at the proper point, the drill is first positioned at point A and the main indicator comprising tape 24 and drum 18 is set to read zero by means of knurled knobs 26 and 19. It may be necessary for very accurate adjustment to loosen screw 33, slide lead screw 5 and consequently carrier 2 the required distance left or right. Screw 33 is then retightened. Alternately, this may be accomplished by turning nut 38 by means of knurled ring 45 with respect to lead screw 5. Crank wheel 6 is now rotated clockwise until the reading $I_a$ inches registers on indicator 24, 18. Crank wheel 6 is now locked by means of device 9, and tape 24 and drum 18 are reset to zero. Locking device 9 may now be removed to release crank wheel 6 for rotation and the distance $I_b$ can be cranked up on indicator 24, 18.

Lead screw 5 is now locked against rotation by crank wheel 6 and device 9, and adjustment is made for the bend allowance BA ($^{20}/_{1000}$ inch). To do this the collars 41 to 44 inclusive are rotated as a unit by means of knurled collar member 40 until index finger 56 is astride index marker 55 which relates to the inside dimension $I_a$. Nut 38 is now rotated with respect to lead screw 5, by means of knurled ring 45, until index finger 56 is astride index marker 50 which is the marker related to the inside dimension $I_b$. In doing this it will be noted that the lead screw 5 has been advanced to the right by $^{20}/_{1000}$ inch which is the bend allowance. The drill bit will now be at the proper point for drilling of hole B.

In order to drill hole C, wheel 6 may be rotated to move carrier 2 to the left $I_b$ inches whereat the main indicator 24, 18 will again read zero. It will be seen that point D must be located in order to read directly the measurement $O_c$ on the main indicator. To accomplish this, crank wheel 6 is again locked and collars 41 to 44 inclusive are rotated as a unit until index finger 56 is astride index marker 50. Nut 38 is then rotated counterclockwise, looking at it from the right, by means of knurled ring 45, until index finger 56 is astride index marker 51 which relates to the outside dimension $O_c$. Lead screw 5 will have been advanced to the left by $^{50}/_{1000}$ inch which is the thickness T. Thus point D is readily located, the main indicator should still read zero but slight adjustment of the tape may be necessary to ensure that this is so. Crank wheel 6 can now be unlocked and the reading $O_c$ cranked up directly.

Alternately, hole C can be located by resetting the carrier 2 to point A and zeroing the main indicator. The equation for the location of point C is as follows:

(2) $\quad A \rightarrow C = I_a + O_c - T + BA = I_a + O_c - (T - BA)$

The measurement $I_a$ is then cranked up on the main indicator and crank wheel 6 is locked in position. Collars 41 and 44 are again rotated as a unit until index finger 56 is astride index marker 55 relating to the inside dimension $I_a$. Nut 38 is now rotated counterclockwise, looking at it from the right hand end, until index finger 56 is astride index marker 51 which relates to the outside dimension $O_c$. Since index markers 50 and 51 are set up to give a displacement of T ($^{50}/_{1000}$ inch) of lead screw 5 on rotation of nut 38 by the amount covered by the arc encompassed between them and rotation of nut 38 through the arc encompassed between index markers 50 and 55 cause displacement of BA ($^{20}/_{1000}$ inch) then movement as effected with respect to the location of point C causes a displacement of $(T - BA)$ inches of lead screw 5 to the left which is a subtraction as required by Equation 2.

The main indicator can now be set to read zero and the measurement $O_c$ cranked up and the hole C thus accurately located.

In order to further illustrate the versatility of the vernier adjustment 20, suppose outside dimensions $O_a$ and $O_c$ are given for the location of point C. The following equation will apply:

(3) $\quad A \rightarrow C = O_a + O_c - 2T + BA = O_a + O_c - (2T - BA)$

This may be readily accomplished by setting the carrier at point A, zeroing the main indicator 18, 24, and cranking up $O_a + O_c$. Crank wheel 6 can now be locked and index markers 52, relating to the outside dimension $O_a$, set astride index finger 56. Nut 38 is now rotated until index finger 56 is astride index marker 51, which relates to the outside dimension $O_c$, and it will be obvious that the carrier will have moved to the left by an amount $T+T-BA$ which is in effect subtracting the amount $(2T-BA)$ as was required.

It will now be seen that once collar members 41 to 44 inclusive are set up correctly an operator can readily locate holes when cognizance is taken of whether outside or inside dimensions are given and the nut 38 set up and rotated in relation to index finger 56 to indicate correctly whether a dimension is taken inside or outside and its relation to the edge bend point.

It will be obvious that other adjustments such as for tolerances which may be in decimals of inches may be readily compensated for. In this case half of the tolerance can be adjusted for taking into account whether or not the adjustment is plus or minus.

Other combinations of collars and scales may be utilized to advantage. For instance, as shown in FIG. 5a, the collar 43a may incorporate a scale calibrated to correspond to radii of bends by providing for an axial displacement of shaft 5 by 0.43 times the radius indicated. In such a case a scale 53a, similar to the scale 53, could be incorporated on collar 44a. The index markers can be so arranged that when the radius of bend dimension calibration is set opposite the proper calibration for the bend allowance on scale 54 and index marker 51a located at the zero point of scale 53, is displaced from index marker 50a in a clockwise direction by the calibration relating to a thickness T, then the use of the device is identical to that described above and the radius of bend is automatically taken account of. The operator need only refer to the index marker related to the dimension he is intending to crank up.

It will also be obvious that other combinations of measurements other than fractions of inches and decimals of inches may be indicated on the main and vernier indicator respectively and compensations made therefor in the indentations 8 on wheel 6 and 13 on shaft 5.

My invention may readily be adapted to a power brake for the right angle bending of sheet material wherein radius of bend and bend allowance must be taken care of.

Other embodiments such as the use of the invention in a micrometer, which do not depart from the spirit and scope of my invention, will occur to those skilled in the art.

I claim as my invention:

1. In a positioning device, a first member, a second member, a lead screw means having a driving connection with each of said members, said first member being displaceable with respect to said second member in response to rotation of said lead screw means, a scale member secured to said second member in parallel relation to said lead screw means, a series of equally spaced windows in said scale member, a calibrated member supported for displacement with said first member and having a plurality of convolutions of a helical scale thereon, and means operated by rotation of said lead screw means for moving the calibrations of said helical scale in order into position for viewing through a selected one of said windows to indicate the displacement of said first member with respect to a point on said scale member related to said selected window.

2. The positioning device as claimed in claim 1 wherein the driving connection between said lead screw and said second member comprises adjustable calibrated means for axially displacing said lead screw means with respect to said second member.

3. A positioning device as claimed in claim 2 wherein means is provided on said second member for zeroing said scale member with respect to a selected position of said first member with respect to said second member.

4. A machine tool positioning device comprising, a frame, a tool carrier, lead screw means threaded into said carrier and journalled for rotation in said frame for movably mounting said tool carrier with respect to said frame, calibrated scale means supported on said frame and extending in a direction parallel to the direction of travel of said carrier and cooperating therewith to indicate the distance traversed by said carrier from a predetermined reference point, windows in said calibrated scale spaced therealong at intervals substantially equal to units of calibration of said scale, calibrated drum means coupled to said lead screw for rotation therewith, and means driven by said lead screw means and operative to effect displacement of said drum along said scale in unison with said tool carrier so that the calibrations on said drum appear consecutively in said windows to indicate the distance traversed by said tool carrier with respect to the unit of measurement on said scale related to the particular window in which the said calibration is appearing.

5. The machine tool positioning device as claimed in claim 4 wherein means is provided on said frame to effect zeroing of said scale with respect to a predetermined position of said carrier with respect to said frame.

6. The machine tool positioning device as claimed in claim 5 wherein said means operative to effect displacement of said drum along said scale in unison with said tool carrier includes further means which may be overpowered to allow rotational positioning of said calibrated drum to indicate a predetermined unit of measurement in a preselected window of said scale.

7. The machine tool positioning device as claimed in claim 4 wherein said lead screw means includes means for axially adjusting the position of the threads of said lead screw means with respect to said frame.

8. A device for accurately positioning a first movable member with respect to a second member having a calibrated scale secured thereto and indicating the displacement on the calibrated scale comprising, threaded means connecting said members and operative on rotation thereof to effect movement of said first member with respect to said second member, a calibrated drum drivably connected to said threaded means for being moved thereby axially in conjunction with said first member, and for being rotated by said threaded means about its axis and adjacent to a series of equally spaced windows in said calibrated scale through which in turn appear the drum calibrations indicating displacement of said first member with respect to the unit of calibration of said scale related to the window through which the drum calibrations are appearing.

9. In a positioning device, a first member, a second member, a threaded screw member having a revolvable connection with said second member and having a driving connection with said first member, said screw member being operative on rotation thereof to move said first member parallel to the axis of the screw member, a drum in rotational engagement with said screw member, means driven by said screw member for moving said drum axially of said screw in unison with said movable member, a scale member extending in parallel relation to the axis of said screw member and secured to said second member, a calibrated helical scale of several convolutions on said drum and window means at equally spaced intervals along said scale member through which in turn calibrations of said helical scale are visible, one at a time, to indicate the displacement of said movable member from the point at which zero displacement was indicated through that respective window.

10. The device as claimed in claim 9 wherein said scale member is adjustably secured to said second member in order to facilitate the establishment of a reference point, and means effecting said rotational engagement between said drum and said screw member, said means being overpowerable to disengage said drum from said screw member to provide for adjustment of said drum to indicate a desired helical scale calibration through the appropriate window of said scale member.

11. The device as claimed in claim 9 wherein said revolvable connection includes means for accurately axially displacing said screw member with respect to said second member.

12. In a positioning device, a first member, a second member, a lead screw having a driving connection with each of said members for displacing said first member with respect to said second member in response to rotation of said lead screw, a scale member movably secured to said second member in parallel relation to the direction of displacement of said first member, said scale member having two series of equally spaced windows extending in opposite directions from a central point on said scale member, a drum member adapted to move axially in conjunction with said first member and having two interlaced calibrated helical scales of several convolutions each thereon, and means to rotate said drum in conjunction with the rotation of said lead screw to show in turn through a selected one of the windows of one series, the calibrations of the helical scale which is related to the displacement of the first member in the same direction from said central point as extends the series of windows from which said one was selected.

13. In a machine for locating points on a sheet which is subsequently given a right angle bend and wherein inside and outside locating dimensions which are related to said bend are provided, a first member, a second member slidably supporting said first member for motion at right angles to the line of the subsequent bend, lead screw means rotatably secured to said second member and effective on rotation to displace the first member with respect to said second member, a calibrated linear scale member secured to said second member in parallel relation to said lead screw, a series of equally spaced windows in said linear scale member, a drum member rotatably supported by said first member, a calibrated helical scale of several convolutions on said drum, means coupling said drum to said lead screw to effect simultaneous rotation thereof and displacement concurrent with that of said first member to show in turn the calibrations on said drum through a selected window of said series to indicate the displacement of said first member with respect to the calibration of said linear scale related to said selected window, and calibrated means to displace said lead screw with respect to said second member to compensate for the thickness, the radius of said bend and the bend allowance for said sheet.

14. The machine as claimed in claim 13 wherein the means to displace said lead screw comprises, a nut member threaded on said lead screw and rotatably secured to said second member, a plurality of collar members fitted for individual rotation about said nut member, an index marker related to an outside dimension to the left of a right angle bend on a first of said collars, an index marker related to the inside dimension to the left of a right angle bend on a second of said collar members, an index marker related to the inside dimension to the right of a right angle bend located on a third collar member, an index marker related to the outside dimension to the right of a right angle bend located on a fourth collar, a calibrated scale related to the axial displacement of the lead screw with respect to said second member with respect to relative motion between the nut member and said lead screw located on at least one of said collar members, and an index finger secured to said second member and adapted to override in indicating relationship and plurality of collar members.

15. A positioning device comprising: a frame arranged to be disposed adjacent to a workpiece supporting table; a manually rotatable lead screw rotatably supported by said frame; a carrier guided by said frame, said carrier having engagement with said lead screw and adapted to be translated therealong by rotation of said lead screw, said carrier having means for positioning a tool with respect to the workpiece; a belt-like flexible scale disposed in a loop parallel to said lead screw, said scale being movably supported with respect to said frame and adapted for at least a portion of said scale to be selectably movable in a direction parallel to said lead screw to any selected zero position; means for registering with said portion of said scale for indicating distances of movement of said carrier and movable therewith; a knob having driving connection with said lead screw; at least one annular ring carried on said knob and having angularly spaced indicia thereon, said ring being selectively rotatable with respect to said knob to any selected zero position for any position of said knob; and reference means carried by said frame, and over-hanging said knob and said ring for cooperating with said indicia.

16. In a positioning device for locating points on a sheet of material, said device having a first and a second member, and a lead screw member separate from and movable with respect to each of said first and second members, said lead screw member having a non-threaded portion rotatably carried by said second member and adapted to slide axially therein without rotation therebetween, and also having a threaded portion in threaded engagement with said first member for effecting relative movement therebetween in response to rotation of said lead screw member, and for effecting joint movement in response to axial non-rotating displacement of said lead screw member, the improvement of means adapted to axially non-rotatively displace the lead screw member with respect to the second member and operative to effect such displacement with compensation for thickness, radius of bend, and bend allowances for the material, said improvement comprising: a nut member having a threaded portion engaging the lead screw member at a part thereof spaced from said first member and having a non-threaded nut portion supported with respect to said second member in a manner permitting rotational nut movement and precluding axial nut movement; a plurality of collar members rotatably secured about said nut member; four index markers related to inside and outside dimensions respectively to the left of and to the right of a right angle bend respectively, and each located on a separate one of said collar members; at least one calibrated scale related to the axial displacement of the lead screw with respect to the second member as a function of relative rotation between the lead screw and said nut member, and carried on one of said collar members; and an index finger secured to the second member in overriding indicating relation with respect to said four collar members and said calibrated scale.

17. The device as claimed in claim 16 wherein one of said collar members is provided with scale indicia thereon spaced to directly relate the required non-rotative axial displacement of the lead screw with respect to the second member to compensate for the radius of a subsequent right angle bend to be imparted to the material.

18. In a positioning device for locating points on a sheet of material, said device having a first and a second member, and a lead screw member separate from and movable with respect to each of said first and second members, said lead screw member having a non-threaded portion rotatably carried by said second member and adapted to slide axially therein without rotation therebetween, and also having a threaded portion in threaded engagement with said first member for effecting relative movement therebetween in response to rotation of said lead screw member, and for effecting joint movement in response to axial non-rotating displacement of said lead screw member, the improvement of means adapted to axially non-rotatively displace the lead screw member with respect to the second member, said improvement comprising: a nut member having a threaded portion engaging the lead screw member at a part thereof spaced from said first member and having a non-threaded nut portion supported with respect to said second member in a manner permitting rotational nut movement and precluding axial nut movement; a plurality of collar members encircling said nut member and rotatable with respect thereto; and a ring scale calibration on at least one of said collar members relating to the axial non-rotative displacement of said lead screw member with respect to said second member when said nut member is rotated with respect to said lead screw member.

References Cited in the file of this patent

UNITED STATES PATENTS

| | | |
|---|---|---|
| 1,167,644 | Jaques | Jan. 11, 1916 |
| 1,370,645 | Hawkes | Mar. 8, 1921 |
| 2,555,243 | Parker | May 29, 1951 |
| 2,618,860 | Engelhart | Nov. 25, 1952 |
| 2,704,890 | Welsch | Mar. 29, 1955 |

FOREIGN PATENTS

| | | |
|---|---|---|
| 7,281 | Great Britain | Mar. 23, 1910 |
| 130,295 | Great Britain | July 31, 1919 |
| 217,802 | Switzerland | Feb. 16, 1942 |